(12) United States Patent
Maeding

(10) Patent No.: US 6,470,670 B2
(45) Date of Patent: Oct. 29, 2002

(54) LIQUID FUEL ROCKET ENGINE WITH A CLOSED FLOW CYCLE

(75) Inventor: Chris Udo Maeding, Unterhachingen (DE)

(73) Assignee: Astrium GmbH, Munich (DE)

( * ) Notice: Subject to any disclaimer, the term of this patent is extended or adjusted under 35 U.S.C. 154(b) by 25 days.

(21) Appl. No.: 09/729,126

(22) Filed: Dec. 1, 2000

(65) Prior Publication Data

US 2001/0015063 A1 Aug. 23, 2001

(30) Foreign Application Priority Data

Dec. 3, 1999 (DE) .......................................... 199 58 310

(51) Int. Cl.$^7$ ................................................. F02K 9/48
(52) U.S. Cl. ....................................................... 60/259
(58) Field of Search ............................ 60/257, 259, 734

(56) References Cited

U.S. PATENT DOCUMENTS

| 5,404,715 A | 4/1995 | Vuillamy et al. |
| 6,226,980 B1 * | 5/2001 | Katorgin et al. .............. 60/259 |

* cited by examiner

Primary Examiner—Louis J. Casaregola
(74) Attorney, Agent, or Firm—W. F. Fasse; W. G. Fasse

(57) ABSTRACT

A liquid fuel rocket engine with a closed direct auxiliary flow cycle has a combustion chamber connected to each liquid fuel source through a respective main liquid fuel supply line. A turbo pump is provided in each main fuel supply line. The turbo pump is driven by a gas generator which is connected to a first bypass fuel supply line for supplying fuel to the gas generator. An exhaust gas duct (8, 9, 10) leads from the gas generator into at least one main fuel supply line for feeding gas generator exhaust gas into the main fuel supply line upstream of the turbo pump.

9 Claims, 4 Drawing Sheets

LIQUID FUEL ROCKET ENGINE WITH A CLOSED FLOW CYCLE

This application is based on and claims the priority under 35 U.S.C. §119 of German Patent Application 199 58 310.2, filed on Dec. 3, 1999, the entire disclosure of which is incorporated herein by reference.

FIELD OF THE INVENTION

The invention relates to a liquid flow rocket engine with a closed flow cycle. Such an engine is equipped with at least one main liquid flow supply line for each fuel component including fuel and oxygen components. The supply line or lines are connected to the combustion chamber. A turbo pump it provided in each liquid fuel component supply line.

BACKGROUND INFORMATION

Liquid fuel rocket engines of the type described above are normally equipped with a gas generator for driving the turbo pump or pumps in the fuel component supply lines. The gas generator is connected to at least one bypass fuel line to provide fuel for operating the gas generator. The exhaust gases from the exhaust gas generator are fed through a respective exhaust gas duct back into the main fuel supply line or lines.

Liquid fuel rocket engines are generally divided into two types, namely engines with a closed flow cycle and engines with an open flow cycle. Such engines are described in U.S. Pat. No. 5,404,715 relating to rocket engines. The engine with a closed flow cycle is referred to as "direct auxiliary flow cycle" engine. Engines with an open flow cycle are referred to as "parallel auxiliary flow cycle" engines. Both types of engine operations according to the prior art have however certain disadvantages. Engines operating with an open flow cycle have a simpler construction particularly with regard to the interface between the main fuel supply line or lines and the combustion chamber. However, open cycle engines have a separate discharge for the exhaust gases of the gas generator whereby impulse losses are unavoidable. Such impulse losses adversely affect the thrust power of the rocket engine. Rocket engines with a closed flow cycle avoid such impulse losses, however closed flow cycle engines have the disadvantage that a complicated and expensive construction is required particularly of the interface between the main flow supply lines and the combustion chamber. The structural components in the interface must all be constructed with due regard to the configuration, size and position of all other components of the interface area which makes the construction and design involved and hence expensive.

OBJECTS OF THE INVENTION

In view of the above it is the aim of the invention to achieve the following objects singly or in combination:
  to provide a liquid fuel rocket engine with a closed flow cycle which nevertheless has a simplified construction while maintaining the advantages of the closed flow cycle;
  to improve the engine's cavitation characteristics and to avoid evaporation of the liquid flow in the main liquid fuel supply line or lines;
  to achieve a rapid mixing of the exhaust gases of the gas generator with the main fuel flow or at least one fuel component, such as liquid oxygen, while simultaneously avoiding an incomplete condensation of the gas generator exhaust gases; and
  to facilitate the initial ignition when starting a closed flow cycle liquid fuel rocket engine.

SUMMARY OF THE INVENTION

According to the invention there is provided a liquid fuel rocket engine with a closed flow cycle, which engine is characterized by the combination of a combustion chamber with at least one main liquid fuel line for each liquid fuel component for supplying liquid fuel to the combustion chamber. A turbo pump is provided in each of the main liquid fuel supply lines. A gas generator for driving the turbo pump or pumps is connected to a first fuel supply byass line for feeding fuel or at least a fuel component, such as liquid oxygen, to operate the gas generator. The exhaust gas of the gas generator is fed through an exhaust gas duct to at least one of the liquid fuel supply lines to a point of the main liquid fuel supply line or lines upstrearm of a respective turbo pump or turbo pumps. In this context the term "liquid fuel components" encompasses the liquid fuel and the liquid oxygen.

According to the invention the exhaust gas duct feeds the gas generator exhaust gas into the main fuel supply stream in an area upstream of the turbo pumps, so that the respective exhaust gas duct or ducts are connected to the respective main fuel supply line at a location where their position is no longer critical to the construction of the interface between the fuel supply lines and the combustion chamber. This construction of the invention is contrary to the prior art in which the exhaust gas ducts are connected to the combustion chamber or to the injection head that leads into the combustion chamber for supplying exhaust gas into the main fuel flow. If only one turbo pump is provided in the main fuel supply line, the invention teaches that the exhaust gas duct or ducts are connected to that main fuel supply line upstream of the respective turbo pump. In case there are several turbo pumps arranged in series in the main fuel supply flow the invention teaches that the exhaust gas duct is then connected upstream of at least the last pump in the row of pumps as viewed in the main fuel flow direction from a fuel source to the combustion chamber. These exhaust gas ducts may however also be connected further upstream even upstream of the first turbo pump of a row of turbo-pumps, for example.

The bypass fuel supply line which feeds fuel to the gas generator can be connected to different fuel sources. For example it is possible that the auxiliary bypass fuel supply lines for the gas generator branch off from the main fuel supply lines for the rocket engine. This branching off of some of the fuel to the gas generator can connect to the main fuel supply line or lines at any suitable location. It is however preferred, that the bypass fuel supply lines for the gas generator are branching off from the main fuel supply line or lines downstream of the turbo pumps. This combination of features according to the invention makes sure that the gas generator is supplied with fuel which is already under a high pressure downstream of the pump or pumps whereby it is possible to achieve higher pressures in the gas generator itself and in the exhaust gases from the gas generator. Higher pressure exhaust gases facilitate on the one hand the return of the exhaust gases into the main fuel flow and on the other hand reduce the impulse losses of the rocket engine.

In another embodiment, the invention provides that a first fuel bypass line is at least partially supplied with fuel from a separate fuel source for the gas generator, for example a separate fuel tank. Using a separate fuel tank for the fuel supply to the gas generator has the advantage that the gas generator may be operated with a different fuel composition or even basically with other fuels altogether than the combustion chamber of the rocket engine. Such a rocket engine thus corresponds to a three-component fuel system or a multi-component fuel system.

In another preferred embodiment the invention provides at least one compressor stage such as a booster pump or jet pump arranged in the main fuel supply line upstream of the respective turbo pump. This feature helps increasing the pressure in the main liquid fuel flow upstream of the turbo pumps particularly in order to make possible the pressure conditions that are required for introducing the exhaust gases from the gas generator upstream of the turbo pumps. The exhaust gas duct from the gas generator is connected to or merges into the main fuel supply line in the area of the compressor stage in the main fuel supply line. The turbo pumps in the main fuel supply line or lines are preferably double flow pumps in order to simultaneously improve the cavitation characteristics. The introduction of the exhaust gases of the gas generator under excess pressure into the main fuel lines also has a beneficial influence on the cavitation characteristic.

An evaporation of the liquid fuel in the main fuel flow can be avoided by a suitable adaptation of the pressure and temperature states in the area where the exhaust gas duct or ducts lead into the main fuel flow. The cavitation characteristic can be further improved by a respective construction of the blades of the turbo pump to counteract an incomplete condensation of the exhaust gases even in spite of a rapid intermixing of the exhaust gas of the gas generator with the main fuel flow.

The condensation of the exhaust gas from the gas generator in the main fuel flow can be further facilitated by reducing the temperature of the exhaust gas prior to the introduction of the exhaust gas into the main fuel flow. For this purpose, for example, a heat exchanger is arranged for cooperation with the exhaust gas duct for cooling the exhaust gas of the gas generator. Such a heat exchanger may for example be provided in the form of a thermal contact between the exhaust gas duct and the main fuel flow line. For example, the exhaust gas duct may be provided in the form of a coil with a number of turns around the main fuel flow line whereby the respective thermal contact is provided between the exhaust duct and the main fuel supply line. The cool main fuel flow thereby reduces the temperature of the gas generator exhaust gas. Another possibility for reducing the temperature of the gas generator exhaust gases is achieved by mixing a portion of the main fuel flow with the exhaust gas with the aid of a further bypass fuel line or fuel branch line which feeds cool fuel from the main line into the exhaust gas duct or ducts. The exhaust gases of the gas generator are thus cooled before they are introduced into the main fuel flow by the mixing with a certain proportion of the cool main fuel whereby the temperature of the exhaust gases can be notably lowered and a condensation of the exhaust gas at the introduction of the exhaust gas, that follows the mixing, into the main fuel flow is facilitated.

In order to facilitate the ignition of the rocket engine during the starting phase the invention provides that the exhaust gas duct comprises duct branches with a switch over or two-way valve whereby a first exhaust duct branch is connected upstream of the turbo pumps to the main fuel flow line while a second exhaust gas branch is connected downstream of the turbo pumps to the main fuel flow line. During the starting phase the switch over valve is so controlled in closed loop fashion that the gas generator exhaust gases are first introduced only downstream of the turbo pumps into the main fuel flow and after starting the valve is switched over to introduce the exhaust gas into the main fuel flow upstream of the turbo pumps. Once the operational state of the rocket engine has stabilized itself sufficiently, the valve is switched over so that the gas generator exhaust gases are introduced into the main fuel flow upstream of the turbo pumps.

The second exhaust gas branch is switched off during normal operations of the liquid fuel rocket engine.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1A:
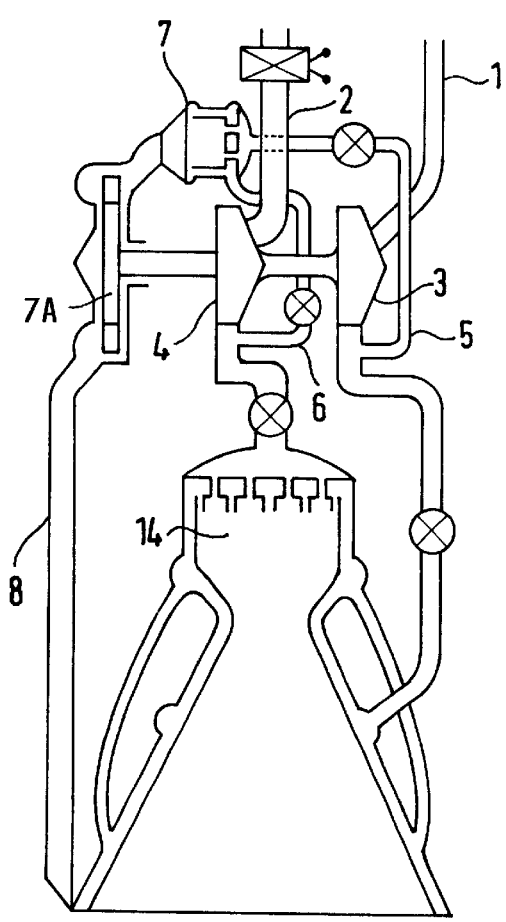
FIG. 1A illustrates schematically a conventional liquid fuel rocket engine having an open or so-called "parallel auxiliary flow cycle"
Figure 1B:
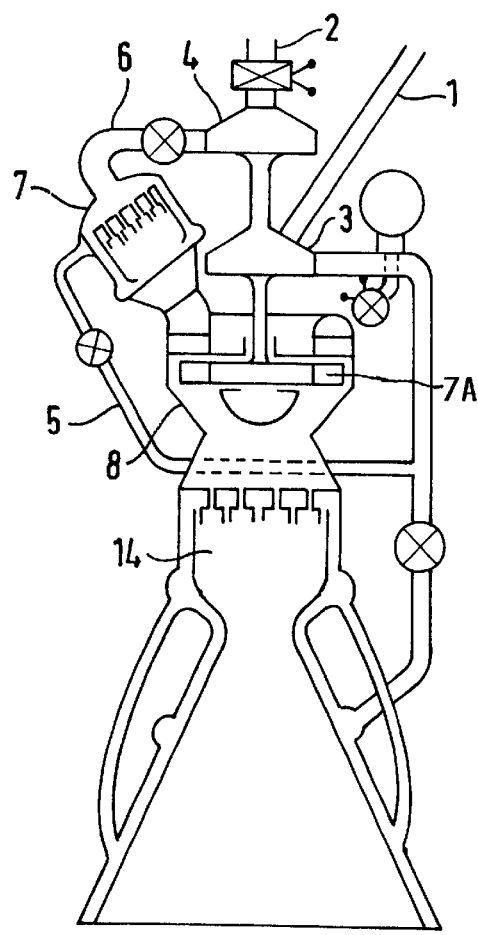
FIG. 1B is a conventional liquid fuel rocket engine with a so-called closed or "direct auxiliary flow cycle"

FIGS. 1A and 1B show conventional liquid fuel rocket engines wherein FIG. 1A shows a rocket engine with an open flow cycle while FIG. 1B shows a closed flow cycle engine.

In FIG. 1A the fuel and oxygen supply lines 1, 2 feed the main flow of liquid fuel to a combustion chamber 14. Turbo pumps 3, 4 are arranged in the fuel and oxygen supply lines 1, 2, respectively. More specifically, the turbo pump 3 is arranged in the fuel line 1 for feeding a liquid combustible fuel. The turbo pump 4 is arranged in the oxygen supply line 2 for supplying liquid oxygen as a fuel component. These turbo pumps 3 and 4 increase the pressure of the liquid fuel and oxygen before it enters into the combustion chamber 14. An auxiliary or bypass fuel flow line 5 leads from a junction point downstream of the pump 3 to a gas generator 7. Similarly, an auxiliary bypass oxygen line 6 leads from a point downstream of. the pump 4 to the gas generator 7 for fueling the gas generator 7 which drives the turbo pumps 3, 4 through a pump drive 7A. An exhaust gas duct 8 connects the exhaust of the gas generator 7 downstream of the pump drive 7A to the combustion chamber 14. Thus, the exhaust gases from the gas generator 7 do not reenter the main fuel flow outside the combustion chamber 14. As a result an impulse loss must be taken into account which in turn results in a reduction of the thrust power of the conventional rocket engine.

In the conventional closed flow cycle rocket engine of FIG. 1B turbo pumps 3, 4 are also arranged in the main fuel flow lines 1, 2 respectively. The pumps 3 and 7 are driven by the exhaust gases of the gas generator 7 passing through the pump drive 7A. The gas generator 7 receives its fuel and oxygen through the bypass fuel lines 5, 6 as in FIG. 1, from the main fuel and oxygen flow lines 1, 2. The exhaust gases of the gas generator 7 are not separately diverted into the combustion chamber. Rather, the exhaust gases pass through the exhaust gas duct 8 into the main fuel flow downstream of the pumps 3, 4. In this way impulse losses are avoided. However, as becomes clear from FIG. 1B the construction of the exhaust gas duct 8 is quite involved and hence expensive particularly at the interface or merging point between the combustion chamber 14 and the area of the liquid fuel and oxygen supply lines 1, 2.

Figure 2:
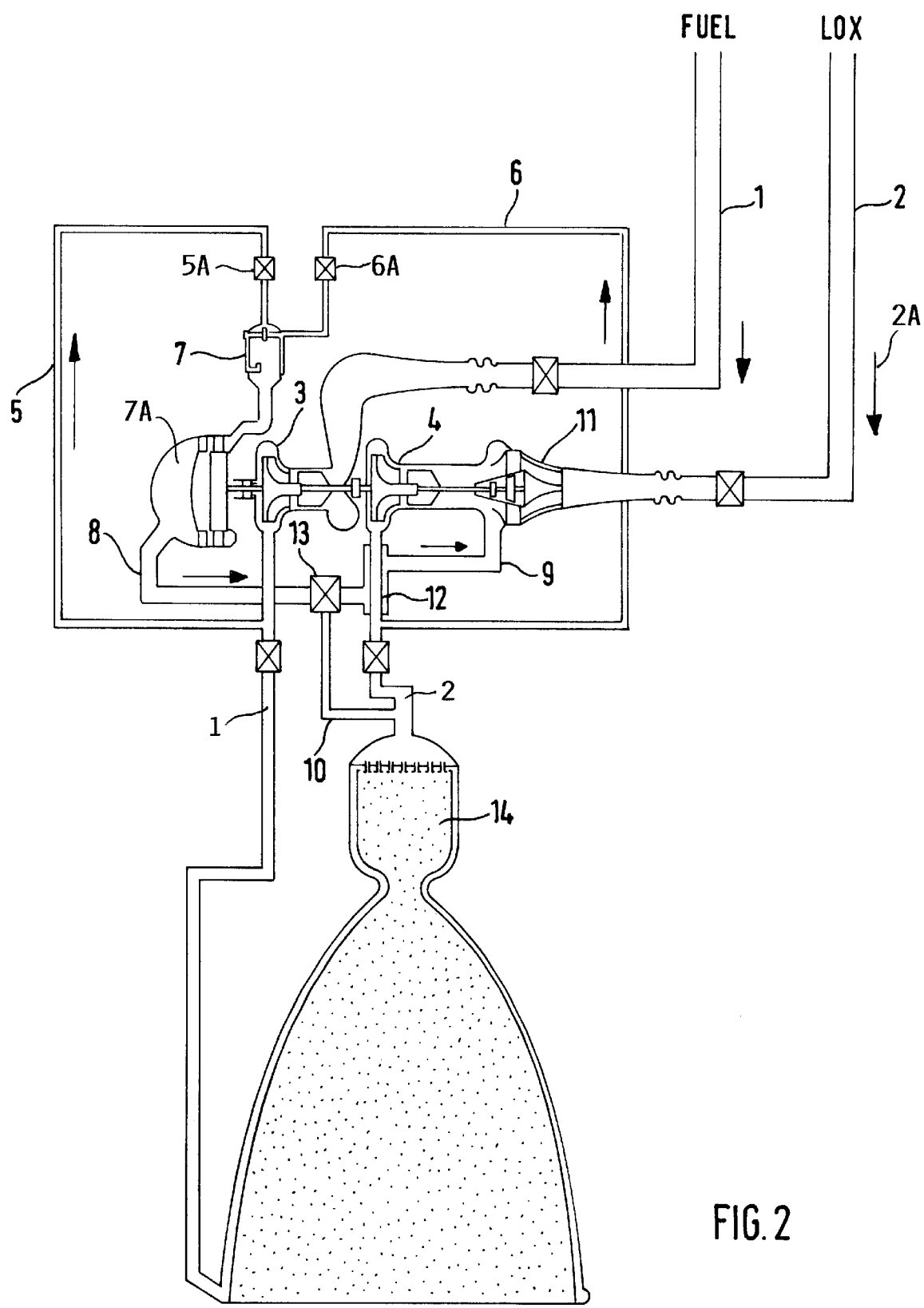
FIG. 2 shows a liquid fuel rocket engine according to the invention with a closed or so-called direct auxiliary flow cycle.

FIG. 2 illustrates the improved liquid fuel rocket engine according to the invention. The turbo pumps 3, 4 are arranged in the liquid fuel supply line 1 and in the oxidizer supply line 2, respectively. In the example embodiment of FIG. 2 the main fuel flow line 1 supplies a combustible liquid fuel to the combustion chamber 14. The oxidizer supply line 2 supplies liquid oxygen LOX to the combustion chamber 14. A booster pump stage 11 is arranged in the main fuel supply line 2 upstream of the pump 4. Fuel for a gas generator 7 is supplied through an auxiliary or bypass fuel line 5 connected to the output of the turbo pump 3 and to the gas generator 7. Liquid oxygen is supplied through a bypass or auxiliary line 6 connected to the output of the pump 4 and to the gas generator 7. A suitable valve 5A, 6A may be provided in the bypass or auxiliary lines 5, 6 respectively. The liquid fuel reacts in the gas generator 7 with a substantial liquid oxygen excess whereby oxygen rich exhaust gases are generated which drive the turbo pumps 3, 4 through a pump drive turbine 7A. At the outlet of the pump drive turbine 7A a gas generator exhaust gas duct 8 leads to a two-way valve 13 which has one outlet connected through an exhaust gas duct branch 9 to a point upstream of the pump 4 in the oxidizer supply line 2. A second outlet of the valve 13 leads through a further branch exhaust gas duct 10 to the liquid oxygen supply line 2 upstream of the combustion chamber 14. Preferably, the first branch 9 passes through a heat exchanger 12 for cooling the exhaust gas by the liquid oxygen prior to feeding the exhaust gas through the duct 9 into the line 2 preferably in the area of the booster pump 11 as shown in FIG. 2. In any event the exhaust gas branch s is connected to the liquid oxygen supply line 2 upstream of the turbo pump 4 as viewed in the flow direction of the arrow (2A). The booster pump 11 improves the pressure conditions required for the introduction of the exhaust gases into the liquid oxygen supply line 2 whereby evaporation is avoided. The second branch line 10 for the exhaust gases from the gas generator 7 leads downstream of the turbo-pump 4 into the main flow of liquid oxygen so that the introduction of the exhaust gases through the branch duct 10 takes place directly upstream of the combustion chamber 14. The two-way switching valve 13 is so constructed that it either feeds exhaust gas to the branch duct 9 or to the branch duct 10 from the gas generator 7.

As shown in FIG. 2 the liquid fuel rocket engine according to the invention has a substantially simpler construction compared to the conventional structures of FIG. 1B. Yet, the present simpler construction avoids the impulse losses that are caused by the closed flow cycle in FIG. 1B.

Figure 3:
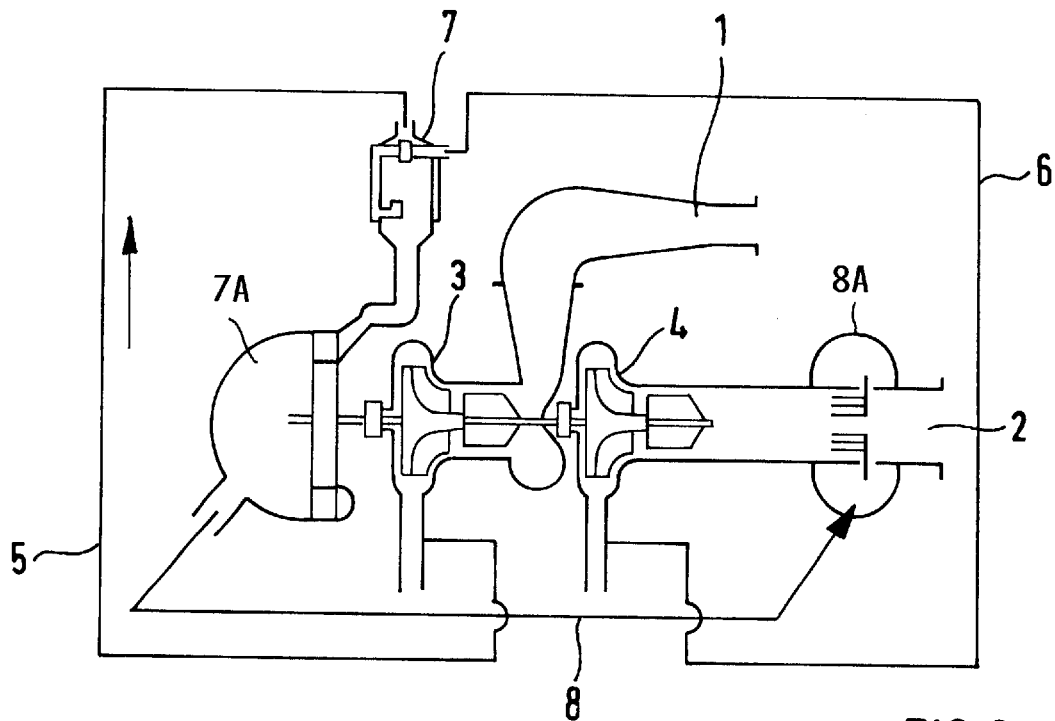
FIG. 3 shows an embodiment similar to that of FIG. 2 with an introduction of the exhaust gases of the gas generator into the main fuel flow upstream of a turbo pump in the main fuel supply line to the combustion chamber which is not shown in FIG. 3.

FIG. 3 shows an alternative embodiment compared to the arrangement of FIG. 2, whereby the exhaust gas duct 8 for the exhaust gases of the gas generator are directly connected to a mixing junction 8A between the duct 8 and the oxygen supply main line 2. In the embodiment of FIG. 3 a booster pump 11 is not used upstream of the turbo pump 4. Thus, the exhaust gas duct or ducts 8 can be connected to the liquid oxygen supply line 2 at any point upstream of the turbo pump 4.

Figure 4:
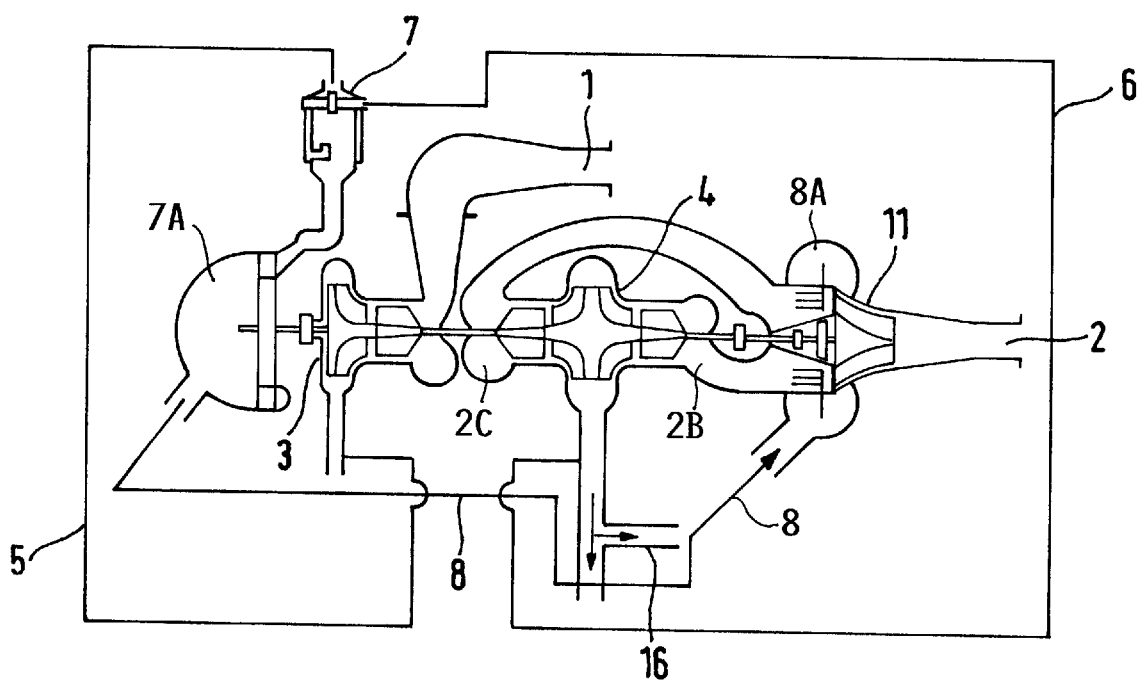
FIG. 4 shows an embodiment similar to that of FIG. 2 in which the gas generator exhaust gases are introduced into the main fuel flow in the area of a compressor stage and further showing the cooling of the exhaust gases by mixing with a portion of the main fuel flow.

FIG. 4 shows another alternative embodiment of the rocket engine according to FIG. 2. The exhaust duct 8 is connected to a mixing junction 8A however after a bypass flow or branch line 16 for mixing cool liquid oxygen with the exhaust gases prior to the feeding of the exhaust gases through the duct 8 into the mixing junction 8A. Thus, a premixing of the exhaust gases with liquid oxygen for cooling the exhaust gases at 16 is achieved prior to introducing the premixed exhaust gases from the generator 7 into the liquid oxygen supply line 2. This feature of the invention achieves an improved cavitation characteristic. A further improvement of the cavitation characteristic is achieved in the embodiment of FIG. 4 by providing the turbo pump 4 as a so-called double flow pump which receives oxygen through two inlet line sections 2B, 2C. The inlet line sections 2B, 2C are connected to respective outlet ports of the booster pump 11.

Figure 5:
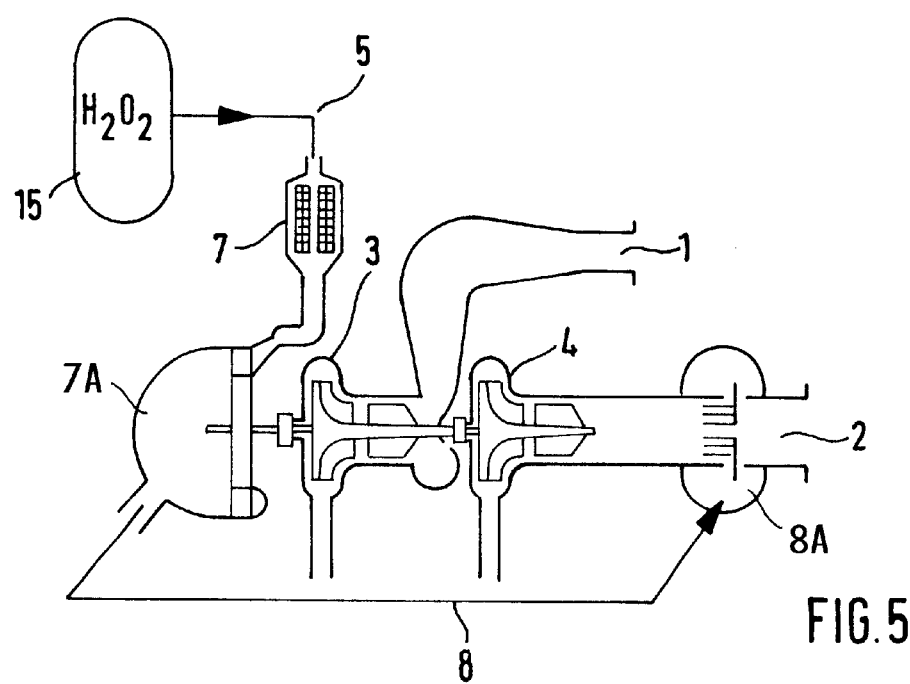
FIG. 5 shows an embodiment similar to that of FIG. 2, wherein a separate fuel source is provided for the gas generator and the gas generator exhaust gases are fed into the main fuel flow upstream of a turbo pump.

In the embodiment of FIG. 5 an auxiliary fuel supply line 5 for feeding fuel to the gas generator 7 connects a separate fuel source 15 to the gas generator 7. The fuel source 15 is, for example, a fuel tank that holds, for instance, $H_2O_2$. Thus, FIG. 5 illustrates an embodiment employing a three component fuel system which uses a liquid fuel and liquid oxygen for operating the combustion chamber 14 while supplying $H_2O_2$ as a third fuel component for operating the gas generator 7. During operation of the gas generator 7 the $H_2O_2$ fuel is catalytically decomposed into its main components $H_2O$ and $O_2$. Thus, $H_2O_2$ as a separate fuel for the gas generator 7, provides the same conditions as does an oxidizer rich combustion that uses liquid oxygen and a liquid combustible fuel such as hydrocarbons.

Figure 6:
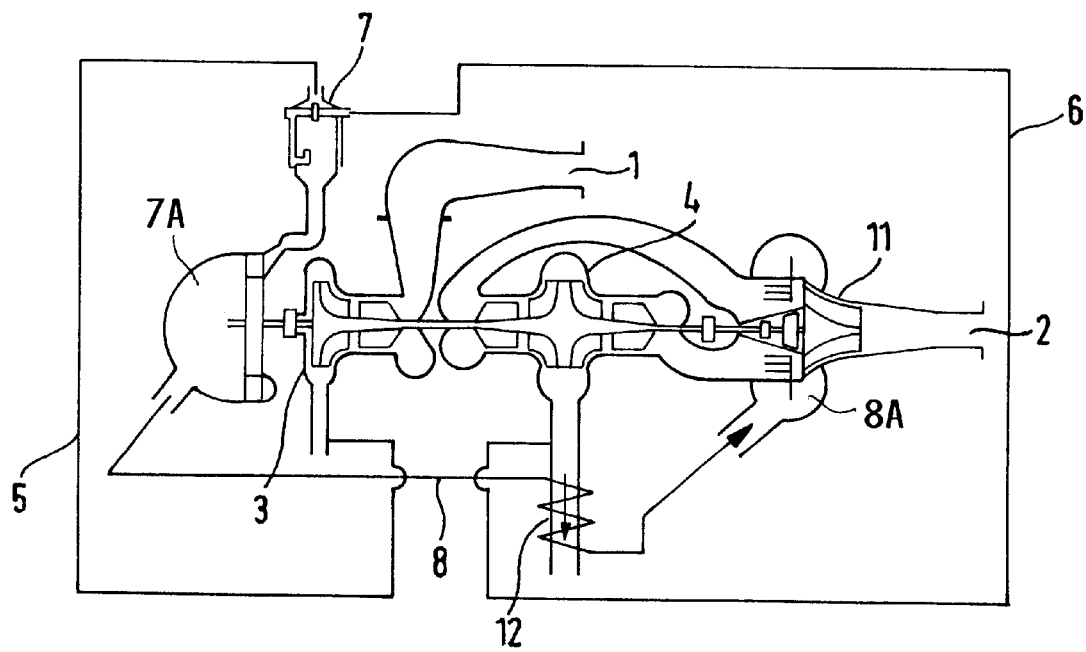
FIG. 6 shows an embodiment similar to FIG. 2 with an introduction of the gas generator exhaust gases in the area of a compressor stage and subsequent to a heat exchange between the main fuel flow and the exhaust gases for cooling the exhaust gases.

FIG. 6 shows an embodiment wherein the exhaust gases of the gas generator are cooled by a heat exchanger 12 provided in the exhaust gas duct 8. For example, the exhaust gas duct 8 is formed as a coil around the liquid oxygen main supply line 2 downstream of the turbo pump 4 whereby a thermal contact between the liquid oxygen flow 2 and the exhaust gas in the duct 8 is established and the exhaust gases are cooled by the liquid oxygen. This cooling facilitates a condensation of the exhaust gas from the generator 7 following its introduction into the main flow 2 of liquid oxygen thereby improving the cavitation characteristic.

According to the invention a strong oxidizer rich combustion of the fuels takes place in the gas generator for the purpose of minimizing any influence on the reaction between the liquid combustible fuel with the liquid oxygen in the combustion chamber 14. As a result, the exhaust gases or combustion products of the gas generator 7 contain a predominant proportion of oxygen. Thus, if these exhaust gases are reintroduced into the main oxygen flow 2 the composition of the liquid oxygen is not substantially changed. As a result, the combustion characteristic in the combustion chamber 14 is not substantially influenced in an adverse manner.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A liquid fuel rocket engine with a closed direct flow cycle, said engine comprising a combustion chamber (14), at least one liquid fuel supply line (1) for supplying liquid fuel to said combustion chamber, an oxidizer supply line (2) for supplying liquid oxygen to said combustion chamber (14), at least one first turbo pump (3) in said liquid fuel supply line (1), at least one second turbo pump (4) in said oxidizer supply line (2), a gas generator (7), an auxiliary fuel line (5) connecting said gas generator (7) to said at least one liquid fuel supply line (1), an auxiliary oxidizer supply line (6) connecting said gas generator (7) to said at least one oxidizer supply line (2), an exhaust gas duct (8, 9, 10) connecting an exhaust gas flow of said gas generator (7) to said oxidizer supply line (2), wherein at least one portion (9) of said exhaust gas duct (8) is connected to said oxidizer supply line (2) upstream of said second turbo pump (4) as viewed in an oxidizer flow direction toward said combustion chamber (14).

2. The liquid fuel rocket engine of claim 1, wherein said auxiliary fuel supply line (5) branches off said liquid fuel supply line (1) for supplying liquid fuel to said gas generator (7), and wherein said auxiliary oxidizer for supply line (6) branches off said oxidizer supply line (2) for supplying liquid oxygen to said gas generator.

3. The liquid fuel rocket engine of claim 1, wherein said auxiliary fuel supply line (5) is connected to said liquid fuel supply line (1) downstream of said at least one first turbo pump (3) in said liquid fuel supply line (1), and wherein said auxiliary oxidizer supply line (6) is connected to said oxidizer supply line (2) downstream of said at least one second turbo pump (4) in said oxidizer supply line (2).

4. The liquid fuel rocket engine of claim 1, further comprising a booster pump (11) operatively connected to said oxidizer supply line (2) upstream of said at least one second turbo pump (4) in said oxidizer supply line (2), and wherein said at least one portion (9) of said exhaust gas duct (8) merges into said oxidizer supply line (2) in an area where said booster pump (11) is connected to said oxidizer supply line (2).

5. The liquid fuel rocket engine of claim 1, further comprising a heat exchanger (12) positioned for cooling exhaust gas from said gas generator (7) in said exhaust gas duct (8, 9, 10).

6. The liquid fuel rocket engine of claim 1, wherein said exhaust gas duct (8, 9, 10) is positioned in thermal contact with said liquid fuel supply line (1) for cooling said exhaust gas of said gas generator.

7. The liquid fuel rocket engine of claim 1, further comprising a branch line (16) connecting said oxidizer supply line (2) to said exhaust gas duct (8, 9, 10) for mixing exhaust gas with liquid oxygen for cooling said exhaust gas.

8. The liquid fuel rocket engine of claim 1, wherein said exhaust gas duct (8) comprises a first exhaust duct branch (9) merging into said oxidizer supply line (2) upstream of said at least one second turbo pump (4) and a second exhaust duct branch (10) merging into said oxidizer supply line (2) downstream of said at least one second turbo pump (4), said engine further comprising a valve (13) so positioned in said exhaust gas duct (8) for selectively controlling an exhaust gas flow to said first and second exhaust duct branches (9, 10).

9. The liquid fuel rocket engine of claim 1 further comprising a turbine driven by said gas generator for driving said first and second turbo pumps (3, 4).

* * * * *

UNITED STATES PATENT AND TRADEMARK OFFICE
CERTIFICATE OF CORRECTION

PATENT NO. : 6,470,670 B2
DATED : October 29, 2002
INVENTOR(S) : Maeding

It is certified that error appears in the above-identified patent and that said Letters Patent is hereby corrected as shown below:

<u>Title page,</u>
Item [57], ABSTRACT, delete the abstract and replace to read:
-- A liquid fuel rocket engine with a closed direct auxiliary flow cycle has a combustion chamber connected to a liquid fuel component source and to a liquid oxygen fuel component source through a respective liquid fuel supply line (1) and through a respective liquid oxygen supply line (2). A turbo pump is provided in each of the fuel supply line and the liquid oxygen supply line. The turbo pumps are driven by a gas generator (7) which is connected to a first bypass auxiliary fuel supply line (5) for supplying fuel to the gas generator and to a second auxiliary liquid oxygen supply line (6). An exhaust gas duct (8, 9, 10) leads from the gas generator (7) into at least the fuel supply line or the liquid oxygen supply line for feeding gas generator exhaust gas into the fuel or oxygen supply line upstream of the respective turbo pump. --

Signed and Sealed this

First Day of April, 2003

JAMES E. ROGAN
*Director of the United States Patent and Trademark Office*